United States Patent [19]

Walker et al.

[11] Patent Number: 4,737,955
[45] Date of Patent: Apr. 12, 1988

[54] SWITCH CLOSURE TEST METHOD AND APPARATUS

[75] Inventor: Karen A. Walker, Portland; Bruce W. Blair, Beaverton, both of Oreg.

[73] Assignee: Tektronix, Inc., Beaverton, Oreg.

[21] Appl. No.: 475,659

[22] Filed: Mar. 15, 1983

Related U.S. Application Data

[63] Continuation of Ser. No. 216,039, Dec. 15, 1980, abandoned.

[51] Int. Cl.$^4$ .............................................. G06F 11/00
[52] U.S. Cl. ........................................ 371/29; 364/521
[58] Field of Search .................. 371/29; 364/518, 521, 364/550; 340/381, 524–525, 644

[56] References Cited

U.S. PATENT DOCUMENTS

| | | | |
|---|---|---|---|
| 3,573,792 | 4/1971 | Reed | 340/286 M |
| 3,623,085 | 11/1971 | Hodson | 340/815.12 |
| 3,743,009 | 7/1973 | Dagerford | 165/11 R |
| 3,754,244 | 8/1973 | Garrett | 340/815.12 |
| 4,222,039 | 9/1980 | Cronin | 340/815.12 |
| 4,236,149 | 11/1980 | Soyck | 340/644 |
| 4,294,065 | 10/1981 | Lane | 57/265 |
| 4,396,910 | 8/1983 | Enemark et al. | 340/514 X |

*Primary Examiner*—Jerry Smith
*Assistant Examiner*—Clark A. Jablon
*Attorney, Agent, or Firm*—George T. Noe

[57] ABSTRACT

A switch closure test method and apparatus is disclosed in which switch position information in the form of logic signals indicative of switch closure status of a plurality of switches is arranged in a predetermined waveform display format for simultaneous viewing.

7 Claims, 2 Drawing Sheets

SWITCH CLOSURE TEST METHOD AND APPARATUS

This is a continuation of application Ser. No. 216,039, filed Dec. 15, 1980, now abandoned.

BACKGROUND OF THE INVENTION

It is often difficult and time consuming to service or verify proper operation of electronic equipment having a large number of circuit adjustments, many of which may be made by means of external controls and switches. For example, a wrong switch setting may result in erroneous operation or indications that give the appearance of other malfunction. In particular, it is desirable to frequently verify proper operation of test and measurement instruments, such as oscilloscopes, and it is essential that the multitude of front panel switches be set correctly and operate properly. Heretofore, such servicing and verification have been achieved by a skilled technician using a lengthy checkout procedure.

SUMMARY OF THE INVENTION

In accordance with the present invention, a switch closure test method and apparatus for electronic equipment both simplifies and reduces the time required for verification of switch positions and switch operation. Switch position information in the form of logic signals indicative of switch closure status of a plurality of switches is stored in one or more registers. For each switch, a logical 0 is provided by the switch closure to ground and a logical 1 is provided by a pull-up resistor when the switch is open. The logic signals are transferred from the registers to a display memory, from which they are read out and displayed all at once in a predetermined format on a display device such as a cathode-ray tube, wherein each switch is assigned a predetermined display location from which the switch setting may be determined at a glance. The display memory may be updated automatically by cyclically interrogating the registers and transferring the information at a rapid rate so that as switch settings are changed, the changes appear immediately in the viewed display.

It is therefore one object of the present invention to provide a switch closure test method and apparatus for simple and rapid checkout of switch positions in electronic equipment.

It is another object of the present invention to provide a switch closure test method and apparatus to permit verification of switch operation of electronic equipment by skilled personnel.

It is a further object of the present invention to provide a switch closure test method and apparatus to facilitate servicing of electronic equipment by allowing the status of all switches associated therewith to be viewed simultaneously on a display device.

Other objects and advantages of the present invention will become apparent from the following description when taken in conjunction with the accompanying drawings.

DETAILED DESCRIPTION OF THE INVENTION

Figure 1:
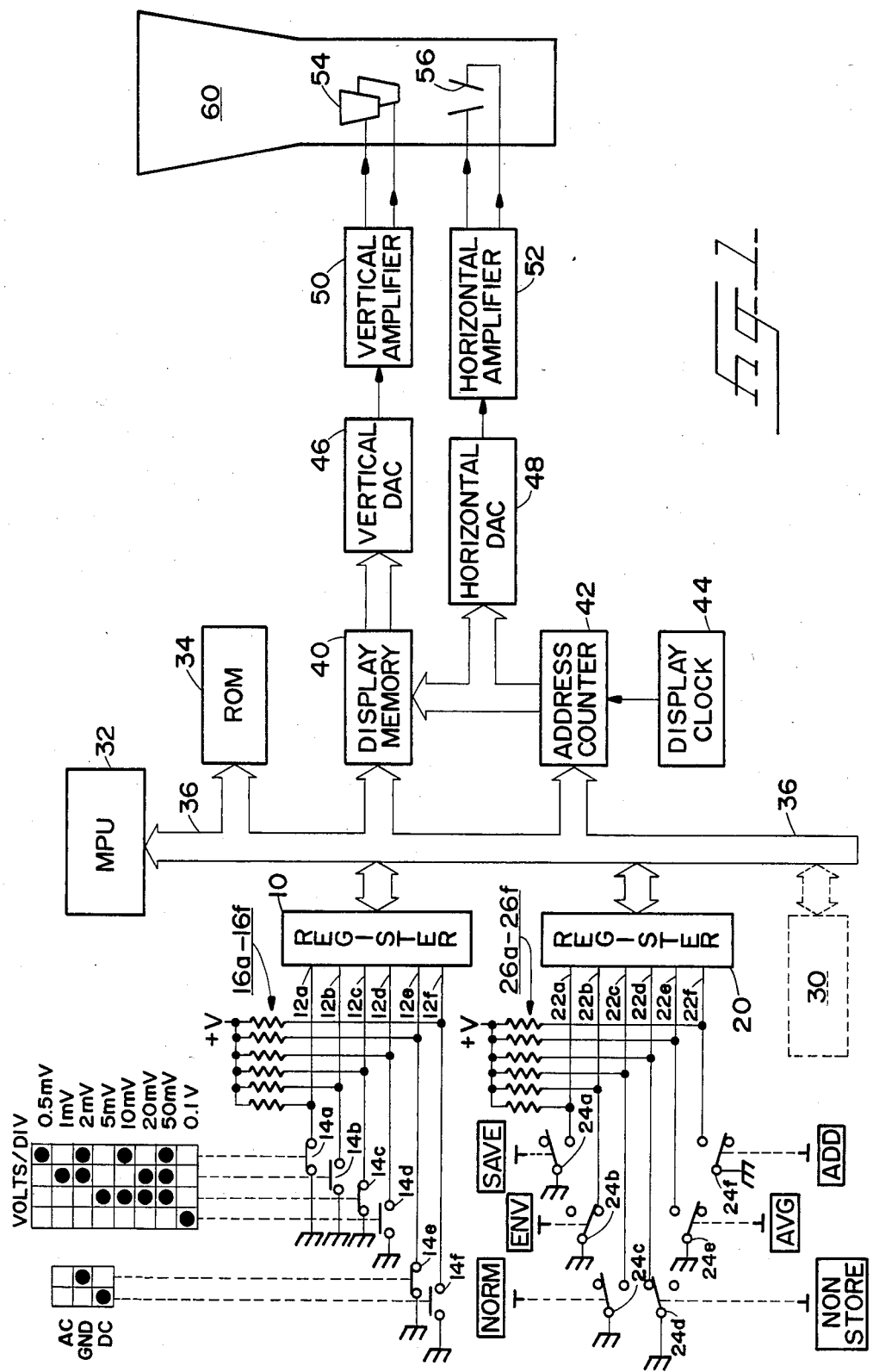
FIG. 1 is a block diagram of a switch closure test apparatus in accordance with the present invention.

Referring now to the block diagram of FIG. 1, there is shown on the left-hand side of the drawing a register 10 having a plurality of input lines 12a–12f. Each input line 12a–12f is connected through a plurality of switches 14a–14f respectively to ground on one hand, and through a plurality of resistors 16a–16f respectively to a source of positive voltage on the other hand. It will be recognized that resistors 16a–16f are pull-up resistors which will produce a logical 1 on the corresponding input lines 12a–12f as long as the corresponding switches 14a–14f are open; a switch closure to ground will produce a logical 0. Switches 14a–14f suitably may be conventional cam-actuated switches, the contacts of which are mounted on a printed circuit board. Such contacts may be provided as an additional set to those employed to actually perform the required functions of the switch. Connected by dashed lines to switches 14a–14f are switch logic diagrams for the input coupling (AC-GND-DC) and vertical sensitivity (VOLTS/DIV) rotary cam-actuated switches of an oscilloscope. These logic diagrams are industry standard for this type of switch; the vertical columns each may be viewed as a wafer on the cam drum, and the black spots may be viewed as cam lobes. For example, with the input coupling switch set to GND and the vertical sensitivity switch set to 10 mV as shown, switches 14a, 14c, and 14e are closed while switches 14b, 14d, and 14f are open, and the corresponding logic signal on the input lines 12a–12f is alternating logical 1's and 0's.

Below register 10 is shown a second register 20 having a plurality of input lines 22a–22f, grounded single pole-single throw switches 24a–24f, and pull-up resistors 26a–26f. The switches 24a–24f as shown are push button switches and each maybe provided in the same mechanical package as the switch which is actually performing the designated function. These switches permit the choice of various digital oscilloscope operating modes, such as normal, waveform envelope (ENV), waveform save, non-store, waveform average (AVG), and waveform addition (ADD). Switches 24a–24f may in one position connect ground to input lines 22a–22f to provide logical 0's, or remove ground in the other position allowing the pull-up resistors to provide logical 1's. As can be discerned, the actual type of switch is unimportant, and many types may be used. Furthermore, the system may be expanded by providing additional registers and their associated logic generating circuits as shown in phantom as register 30. The embodiment built and tested is part of a sophisticated oscilloscope having dual vertical amplifier channels, dual time bases, and both digital and conventional analog signal processing capabilities, and consequently several registers are used to accommodate about 40 switches.

A control system including a microprocessor (MPU) 32, a read-only memory (ROM) 34 and an interconnecting bus 36 establishes the test and display format, and transfers data from registers 10, 20, and 30 to a display memory 40. In its simplest form, the control system could be a hard-wired logic-gating circuit connected between a single register or latch and the display circuitry. The ROM 34 suitably contains instructions for formatting a display such as the one shown in FIG. 2, and establishes a sequence for reading the switch registers and loading data into the display memory 40. Further, an associated address counter 42 may be preloaded or pre-set to provide partial tests or a format rearrangement. The microprocessor 32 may suitably be a commercially-available microprocessor.

When the switch position data is loaded into display memory 40, the address counter 42 is activated and operates in response to a display clock 44 to sequentially read the data out of memory and apply it to a vertical digital-to-analog converter (DAC) 46. At the same time, the address signals are applied to a horizontal DAC 48. The converted vertical and horizontal analog signals are then processed by vertical and horizontal amplifiers 50 and 52 respectively to provide push-pull signals suitable to drive the vertical and horizontal deflection plates 54 and 56 respectively of a cathode-ray tube 60. The display circuitry discussed in this paragraph is conventional and therefore is typical of that found in many digital oscilloscopes.

The microprocessor 32 may be used to monitor the registers 10, 20, 30 and immediately update the display memory with any charges in the switch position. Thus, a person changing the setting of a front-panel switch will be able to immediately see the change in position in the display.

Figure 2:
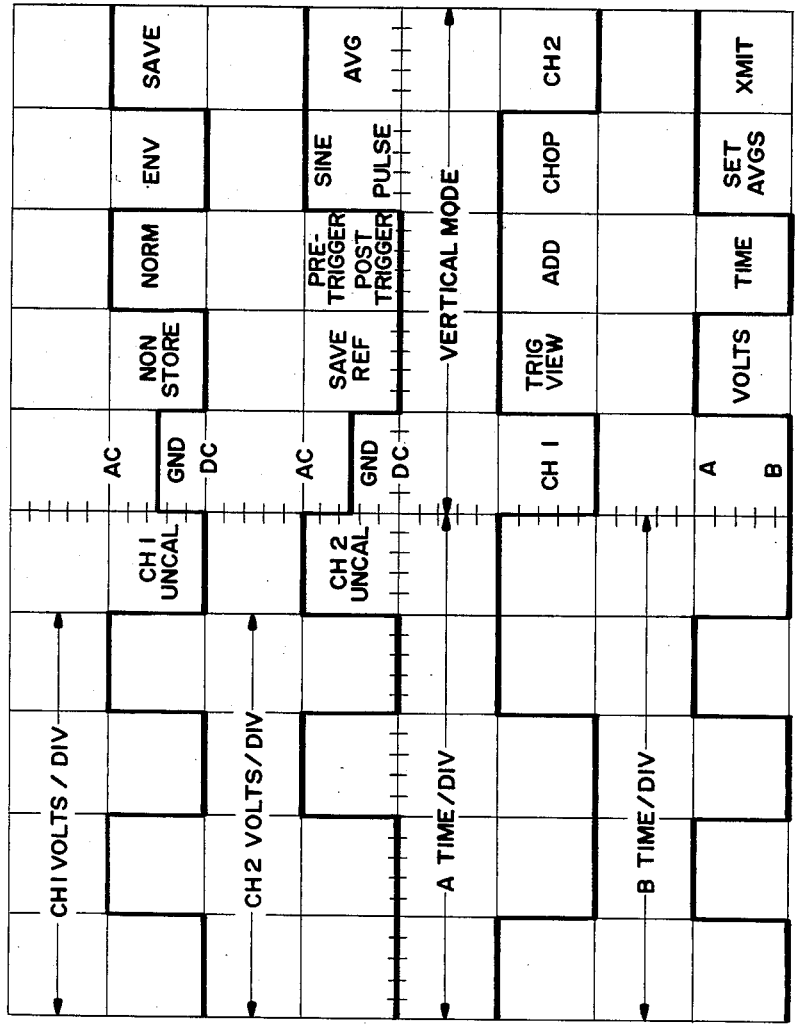
FIG. 2 illustrates a switch closure test display format.

FIG. 2 shows an oscilloscope dislay of a switch closure test in which the logic signals produced by the apparatus of FIG. 1 are formatted in a manner similar to a logic analyzer display. In this example, an oscilloscope graticule grid is shown, and four traces are automatically positioned vertically on screen in such a manner that each graticule division provides the switch setting information for one switch. The switches are assigned to predetermined locations so that a diagram such as FIG. 2, complete with switch setting indicia, may be printed in an instruction manual or provided as a transparent overlay for the oscilloscope screen to thereby allow unskilled personnel to quickly verify switch settings and switch operation. The logic waveforms are easily interpreted—if the 0 state is shown, the switch is closed (or in the position designated by the indicia), and if the 1 state is shown, the switch is open. Note that the logic pattern associated with CH 1 VOLTS/DIV is the same as that indicated at the 10 mV position as discussed in connection with FIG. 1. Also, tri-state logic may be implemented for some multi-position switches such as indicated in connection with the AC-GND-DC switches. Further, since the display memory is capable of holding multiple-bit signals at each storage address, as is the case when storing waveform voltages levels, potentiometer settings, e.g., position and trigger threshold, may be displayed as analog voltage levels.

While we have shown and described the preferred embodiment of our invention, it will be apparent to those skilled in the art that many changes and modifications may be made without departing from out invention in its broader aspects.

What we claim as being novel is:

1. In a waveform display apparatus having a plurality of front-panel switches having selectable switch positions, a switch-selection status test method, comprising the steps of:
   (a) generating logic signals indicative of the switch position status of said switches;
   (b) storing the logic signals in a display memory; and
   (c) reading said logic signals out of said memory and displaying said signals on a display device in a predetermined waveform format wherein each of said plurality of switches has a predetermined display location.

2. A method in accordance with claim 1 wherein said logic-signal generating step comprises arranging each switch on an input line of a logic circuit in such a manner that a logical 0 is produced when the switch is in a first condition and a logical 1 is produced when the switch is in a second condition.

3. A method in accordance with claim 1 wherein said displaying step comprises arranging said signals for simultaneous viewing on a cathode-ray tube.

4. In a waveform display apparatus having a plurality of front-anel switches having selectable switch positions, a switch-selection status test apparatus, comprising:
   means for generating logic signals indicative of the switch position status of said switches;
   means for storing said logic signals, and
   means for displaying said logic signals in a predetermined waveform format wherein each of said plurality of switches has a predetermined display location.

5. A switch test apparatus in accordance with claim 4 wherein said storing means comprises at least one storage register having an input connected to each of said plurality of switches, a display memory, and control means for transferring the output of said register to said display memory.

6. A switch test apparatus in accordance with claim 5 whereins aid control means comprises a microprocessing unit.

7. An apparatus in accordance with claim 4 wherein said displaying means comprises a cathode-ray tube upon which said logic signals are arranged for simultaneous viewing.

* * * * *